(12) United States Patent
Henninger

(10) Patent No.: US 12,509,270 B2
(45) Date of Patent: Dec. 30, 2025

(54) METERED DUAL-CHAMBERED DRINKING AND DISPENSING ACCESSORY AND METHOD OF USE

(71) Applicant: Charles Henninger, Atlanta, GA (US)

(72) Inventor: Charles Henninger, Atlanta, GA (US)

( * ) Notice: Subject to any disclaimer, the term of this patent is extended or adjusted under 35 U.S.C. 154(b) by 74 days.

(21) Appl. No.: 18/309,170

(22) Filed: Apr. 28, 2023

(65) Prior Publication Data

US 2024/0017871 A1    Jan. 18, 2024

Related U.S. Application Data

(63) Continuation of application No. 29/865,188, filed on Jul. 13, 2022.

(51) Int. Cl.
   *B65D 1/04* (2006.01)
   *B65D 1/02* (2006.01)
   *B65D 23/04* (2006.01)

(52) U.S. Cl.
   CPC ............ *B65D 1/04* (2013.01); *B65D 1/0207* (2013.01); *B65D 1/023* (2013.01); *B65D 23/04* (2013.01)

(58) Field of Classification Search
   CPC ........ B65D 1/04; B65D 1/0207; B65D 1/023; B65D 23/04; B65D 81/3288; B65D 41/04; B65D 35/22
   USPC .................................. 220/507, 23.83; 215/6
   See application file for complete search history.

(56) References Cited

U.S. PATENT DOCUMENTS

| | | | |
|---|---|---|---|
| 582,380 A * | 5/1897 | Tebbutt | B65D 25/082 |
| | | | 222/455 |
| D206,943 S | 2/1967 | Kinney | |
| 4,106,673 A | 8/1978 | Donoghue | |
| 4,474,312 A | 10/1984 | Donoghue | |
| 5,330,081 A * | 7/1994 | Davenport | G01F 11/286 |
| | | | 222/207 |
| D371,720 S | 7/1996 | Hung | |
| 6,290,102 B1 * | 9/2001 | Jennings | G01F 11/262 |
| | | | 222/158 |
| 7,185,788 B2 | 3/2007 | Morris | |
| D583,193 S | 12/2008 | Kushner | |
| 7,549,395 B2 | 6/2009 | Stenberg | |
| 7,665,631 B2 | 2/2010 | Pilowski | |
| 8,944,293 B2 | 2/2015 | Roth et al. | |
| 9,730,539 B2 | 8/2017 | Bolland | |
| 2011/0108562 A1 * | 5/2011 | Lyons | B65D 81/3846 |
| | | | 220/739 |

(Continued)

*Primary Examiner* — Don M Anderson
*Assistant Examiner* — Elizabeth J Volz
(74) *Attorney, Agent, or Firm* — Richard C. Piercy, Esq.; Grell & Watson Patent Attorneys LLC

(57) ABSTRACT

A dispenser to dispense a liquid in two or more metered portions. The dispenser has a flexible main reservoir with fluid connections to two or more smaller metered dispensing reservoirs. Each reservoir has a spout and can be sealed via a threaded cap. When a user loosens or removes the cap of the metered dispensing reservoir(s) and squeezes the flexible main reservoir, metered portions of liquid are delivered to each metered reservoir which can be dispensed and/or consumed directly. Such dispensing or consumption can be controlled to occur simultaneously or individually via removal of each cap and inversion of the dispenser. Each reservoir may feature specialized contours, volumetric indicators, angled spouts, and other improvements.

12 Claims, 9 Drawing Sheets

(56) References Cited

U.S. PATENT DOCUMENTS

2011/0132922 A1 6/2011 Summers et al.
2012/0111450 A1 5/2012 Claps

* cited by examiner

METERED DUAL-CHAMBERED DRINKING AND DISPENSING ACCESSORY AND METHOD OF USE

CROSS REFERENCE TO RELATED APPLICATIONS

To the full extent permitted by law, the present United States Non-provisional patent application hereby claims priority to and the full benefit of U.S. Design patent application entitled "TRIPLE NECK FLASK," having assigned Ser. No. 29/865,188 filed on Jul. 13, 2022, which is incorporated by reference in its entirety.

FEDERALLY SPONSORED RESEARCH OR DEVELOPMENT

None.

PARTIES TO A JOINT RESEARCH AGREEMENT

None.

REFERENCE TO A SEQUENCE LISTING

None.

FIELD OF THE DISCLOSURE

The present disclosure generally relates to specialized beverage dispensers. More specifically, the present disclosure is directed to a drinking and dispensing accessory vessel offering the ability to store and dispense metered amounts of liquids via two sub-vessels.

The present disclosure is not limited to any particular liquid, beverage or otherwise, nor any particular volume, temperature, or intended use thereof.

BACKGROUND

A bottle, flask, or canteen may be a type of drinking accessory that is designed to hold and transport liquids, particularly water and other potable liquids, while on the go. Historically, canteens were used by soldiers in the field to provide them with a portable source of hydration, but today they are often used by hikers, campers, and outdoor enthusiasts of all kinds. Traditional canteens are typically made of metal or plastic and may offer a screw-top or other type of lid and/or a carrying strap. They can range in size from small, compact containers to larger ones that hold several liters of water or other liquids. In addition to their practical uses, canteens, bottles and flasks have also become popular fashion accessories, with many brands offering designs that are stylish and eye-catching. Some of these drinking accessories even come with customizable designs, allowing individuals to personalize their hydration gear to match their personal style. Overall, drinking accessories of various types continue to be a popular and practical travel accessories, providing users with a convenient and portable source of hydration whether they are hiking in the wilderness or just going about their daily routines.

A twin-neck flask with a metered compartment may generally comprise a specialized type of flask that is designed for measuring and dispensing precise, known amounts of liquid. The flask typically has two necks, or openings, with one neck being used for filling the flask and the other neck for dispensing the liquid in a measured amount. The metered compartment, located inside the flask and/or connected thereto, is designed to measure and dispense specific volumes of the liquid. Twin-neck flasks with metered compartments are commonly used in scientific and laboratory settings, where precise measurements of liquids are required for experiments and procedures. They are also used in the pharmaceutical industry, where accurate dispensing of medication is critical. Yet other uses of twin-neck flasks with metered compartments may be the consumer market. They are often used for measuring and dispensing precise amounts of liquids such as alcohol, syrups, oils, and flavorings. Where the home landscaper or gardener may purchase and use twin-neck flasks for the storage and dispensing of oil to mix in a fuel/oil mixture for small engines, the home bartender or cook might similarly store and dispense common ingredients from such flasks to ease and routinize the dispense of said ingredients. Generally, such twin-neck flasks feature a main reservoir where the bulk of the liquid may be stored prior to use and a second or sub-reservoir and/or compartment for the measurement and dispense of the same. Each reservoir may be connected by a tube and/or siphon. The siphon may extend from the bottom of the main reservoir to the top of the compartment. In use, closure of the main reservoir, via a threaded lid and loosening of the compartment via another threaded lid, then the application of pressure, via a squeeze of the main reservoir, may cause the liquid of the main reservoir to enter the compartment via the siphon tube. Siphoning may generally continue until a threshold is reached, which may be controlled via vertical placement of the siphon tube upon the compartment. When the threshold is reached, reverse siphoning may occur, which may prevent the compartment from overfilling and/or overflowing. Such reverse-siphoning may cause the liquid to return to the main reservoir, thereby achieving the intended result of metering the amount of liquid in the compartment. Then, the lid of the compartment may be fully removed, and the metered amount of liquid may be dispensed.

The design of twin-neck flasks with metered compartments may allow for the easy and accurate measurement and dispensing of liquids, reducing the risk of spills and waste. They are also typically made of durable materials such as glass or, in perhaps preferred embodiments, as high-quality, food-safe/grade plastics, ensuring they can withstand repeated use and the handling of various types of liquids.

Overall, twin-neck flasks with metered compartments may provide a practical and efficient solution for measuring and dispensing liquids in a variety of settings, from scientific laboratories to home kitchens. However, each "dose" or dispense must be repeated if multiple doses and/or dispenses are required. So if, for instance, two volumes of a liquid are needed for a particular recipe, the steps of lid opening, lid closing, squeezing, pouring etc. must be repeated. Additionally, though such vessels may be convenient for home and recreational use, they largely have not been adopted for such use, perhaps for this reason. Additionally, such vessels are largely absent from recreational and/or celebratory uses and predominantly appear as seldomly-used oil storage vessels in the homes in which they happen to appear.

Due to other shortfalls that may exist in the design of current twin-neck flasks with metered compartments, they may indeed lack any use in the novelty, celebratory, party, outdoor recreation, and/or event accessory market and are not known to be featured in any pre-packaged spirit and/or libation manufacture. For instance, no known spirit brand bottles/packages its beverages into twin-neck flasks with metered compartments, despite the compelling utility in provisioning metered amounts of its beverage when mixing drinks. Furthermore, partygoers are not known to encounter these flasks when attending celebratory events, despite their ability to offer dispense of beverages commonly served therein. Other shortfalls of such devices known to be sold in the marketplace may also exist, including but not limited to difficulty pouring/decanting non-viscous and/or minimally viscous liquid into glassware without dripping, difficulty drinking from such available devices, the like, and/or combinations thereof. Furthermore, existing flasks marketed for drinking may further suffer from such shortfalls, in addition to their inability to meet the need for dispense of metered volume(s) of liquid(s).

It would thus be advantageous to the art to have a flask designed to address the specific shortfalls of existing twin-neck flasks, such that they may be more readily adopted to various home, recreational, and celebratory uses. Several improvements to the overall shape and manufacture of twin-neck flasks having metered compartments are disclosed herein to address these shortfalls.

The instant disclosure may be designed to address at least certain aspects of the problems or needs discussed above by providing such a specialized flask. Such a flask may be comprised of one or more metered compartments having some or all of these improvements. By providing such a flask, labor cost may be reduced in bartending/cooking uses and adoption in home and/or celebratory uses may be achieved.

SUMMARY

The present disclosure may solve the aforementioned limitations of the currently available twin-neck flasks, bottles, and drinking/party accessories by providing a metered dual-chambered drinking and dispensing accessory and method of use.

Accordingly, in one aspect, the present disclosure embraces the simplicity that may be achieved through the production and use of a metered dual-chambered drinking and dispensing accessory. This may be achieved via the manufacture of a multi-part assembly featuring a first, a second, and a third cap and a metered dual-chambered drinking and dispensing flask. Each cap may be, in a potentially preferred embodiment of the metered dual-chambered drinking and dispensing accessory, threaded and configured to receive one of three spouts of the metered dual-chambered drinking and dispensing flask. The metered dual-chambered drinking and dispensing accessory may include, in the potentially preferred embodiment, a reservoir chamber, a first metered chamber, a second metered chamber, and three spouts. In such an embodiment, each of three spouts may be linked to one respective chamber and allow liquid to flow therefrom. The reservoir may be linked via a tube to each of the first metered chamber and the second metered chamber. The reservoir chamber may be larger in volume than either of the first and second metered chambers, such that liquid fully consuming the space therein can sustain multiple fillings, dispensing, and refilling cycles.

In use, the metered dual-chambered drinking and dispensing accessory may be first opened at a spout by removing or not installing the cap for the spout corresponding to the main reservoir chamber. Then, liquid may be poured into the main reservoir chamber to the desired volume. Next, the cap of this spout may be replaced, and preferably closed, in order to create an airtight seal. Alternatively, the metered dual-chambered drinking and dispensing accessory may be manufactured and sold having been pre-filled with a specific liquid therein the main reservoir chamber and sealed. One or more of the caps to the metered chamber(s) may then be removed, or perhaps preferably, loosened. A user may then squeeze the main reservoir chamber by placing their fingers upon one side of the chamber and thumbs upon the other side and bringing each flange set and thumb together. Liquid in the main reservoir chamber may then travel, via tubes connecting the main reservoir to the metered chamber(s) until the user stops squeezing. Liquid may continue to travel into the metered chambers until the user ceases the squeezing force upon the main reservoir chamber, upon which time, excess liquid may be forced from and/or suctioned from the metered chamber(s) back into the main reservoir chamber due to pressure being relieved on the main reservoir chamber. Then, the user may fully remove the cap(s) of the metered chamber(s), if the cap(s) was loosened rather than removed, and dispense or drink from the metered dual-chambered drinking and dispensing accessory. If the user intends to dispense the liquid, he or she may place drinking vessels beneath spouts of the metered chamber(s) in number corresponding to the number of metered chamber(s) which had caps removed during squeezing. If the user intends to drink from the metered dual-chambered drinking and dispensing accessory, he or she may do so with a "drinking partner" by standing side-by-side, placing their lips against the corresponding spouts, and drinking as they would from a single-spouted bottle or flask. During uses where drinking partners drink from the metered dual-chambered drinking and dispensing accessory, various games and/or frivolities may be enjoyed before, during, or after consumption of the liquid. Additionally, various games and/or frivolities may be created, which would otherwise be impossible through use of a single-spouted vessel. Additionally, since the metered chambers may be identical in volume to each other, those participating in drinking challenges may utilize this property to ensure fair play and comparable consumption.

In some potentially preferred embodiments, the metered dual-chambered drinking and dispensing flask may be molded from clear, translucent, or transparent plastic which may preferably be rigid enough to hold liquid without spilling or changing shape, but flexible enough to be squeezed in order to provide the functions as described herein. In such an embodiment, the metered dual-chambered drinking and dispensing flask may be manufactured from and/or to achieve a single unit of manufacture with only one part. Each chamber of the double metered dispenser bottle with attachment flask may or may not feature markings indicating the volume therein when placed upon a leveled surface to reveal the meniscus, as may be understood by those having ordinary skill in the art. Such markings may be printed on the surface of the metered dual-chambered drinking and dispensing flask or molded in such a way to create an embossed, recessed, and/or raised lettering, which may be visible to the user.

In this and other potentially preferred embodiments, the opening of each metered dual-chambered drinking and dispensing accessory may feature a slanted spout to dispense from one or more of the metered chambers. Such a slanted spout may achieve various benefits, including but not limited to making it easier to drink the liquid contained in each chamber without spilling. Furthermore, drinking and dispensing liquid from each chamber without needing to tilt the metered dual-chambered drinking and dispensing accessory may be achieved via the slanted spout. Though adapting such a spout upon each chamber may offer such benefits, doing so may cause liquids to splash or otherwise spill from one or more metered chambers during filling. In such an embodiment with a slanted spout improvement, various internal structures and/or shapes may be provided within the metered chamber(s) to limit such spilling/splashing.

In an alternate embodiment of the metered dual-chambered drinking and dispensing accessory, additional accessories and/or adaptations to manufacture may further enhance the recreational utility of the metered dual-chambered drinking and dispensing accessory. One such additional accessory may be an aperture therebetween the siphon tube and main body of the metered dual-chambered drinking and dispensing accessory. Such an aperture may be capable of threading and/or installing a rope, string, keychain, carabiner, clip, the like and/or combinations thereof to allow the metered dual-chambered drinking and dispensing accessory to be linked and/or attached to a personal item, such as a backpack, cooler, jacket, luggage, hook, the like and/or combinations thereof during transport or for storage. Additional apertures may be provided to enable the metered dual-chambered drinking and dispensing accessory to operably combine with other accessories and/or metered dual-chambered drinking and dispensing accessories. In a potentially preferred embodiment of the metered dual-chambered drinking and dispensing accessory, it may be packaged, sold, or otherwise marketed with a clip, which may feature one or more semi-cylindrical brackets which may enable the clip to operably combine with the metered dual-chambered drinking and dispensing accessory at, for instance, the siphon tube. These preferably long apertures along where the siphon tube meets the main body of the metered dual-chambered drinking and dispensing accessory may be capable of receiving the semi-cylindrical portion of the clip to enable the clip to rotate about the siphon. Such a clip may be symmetrical and have an accompanying clip opposite this portion to enable two metered dual-chambered drinking and dispensing accessories to be combined in a stacked arrangement. Furthermore, due to the rotational capabilities, two or more metered dual-chambered drinking and dispensing accessories may be joined in series linearly or may form a triangular (with 3 metered dual-chambered drinking and dispensing accessories), square (with 4 metered dual-chambered drinking and dispensing accessories), or other multi-sided polygonal (with 4+ metered dual-chambered drinking and dispensing accessories) arrangements. Stacked arrangements, when joined, may be more easily transported and linear arrangements may enable more than two individuals to practice the method of use together in a line.

Other shortfalls of existing devices may also be addressed through manufacture and use of the double metered dispenser bottle with attachment accessory and methods of use of the disclosure. Such devices that may cause difficulty pouring/decanting non-viscous and/or minimally viscous liquid into glassware without dripping may be improved via an angled spout capable of reducing both the potential for drip and the turbulation during dispensing that may be otherwise caused when fluid exists a spout, causing a negative pressure, and subsequently causing entry of air into the vessel. Such an angled spout of the disclosure may both reduce the angle of tilt necessary to drink from such a vessel, but reduce and/or eliminate the disruption of liquid's exit from the device, i.e., minimizing and/or eliminating the glugging effect when pouring or drinking from the container. Glugging may be understood by those having ordinary skill in the art as the physical phenomenon which occurs when a liquid is poured rapidly from a vessel with a narrow opening, such as a bottle. Additional features and benefits may also be present, in part due to such an angled spout of the metered dual-chambered drinking and dispensing accessory of the disclosure. For instance, one or more drinkers using the metered dual-chambered drinking and dispensing accessory may squeeze the device to obtain the measured volume, release the squeeze, begin drinking from the spout, and then re-applying the squeeze to force additional liquid into the metered compartment of the metered dual-chambered drinking and dispensing accessory. Such an optional or enhanced method of use of the h metered dual-chambered drinking and dispensing accessory may be understood as a "power shot", because it provides an additional volume to the drinker beyond what might be offered in a traditional shot volume. Finally, benefits may exist which may be recognized by those having ordinary skill in the art as it relates to consumption of spirits from traditional flasks. Since the metered dual-chambered drinking and dispensing accessory may feature a primary compartment and/or reservoir in addition to various sub-compartments and/or reservoirs, each of which may offer spouts for filling and/or dispense/consumption, a consumer may drink from any of such spouts, offering added flexibility during consumption for various reasons known to those having ordinary skill in the art. This may include prevention of the spread of communicable diseases from sharing drinking containers in that one person may drink from each spout. It may additionally include the ability to drink small amounts from sub-containers and large amounts from large containers. In combination with the benefit of the angled spout and siphoning tube, it may further include the ability to continuously drink from a sub-container without needing to severely tilt the flask, as may be necessary when a volume within the main reservoir has diminished. Since ordinary flasks require the user to tilt the flask higher to continue consuming the liquid therein as the volume diminishes, the ability to move liquid into a container that can be filled more fully may decrease the tilt required to consume from the metered dual-chambered drinking and dispensing accessory.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-8, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure solves the aforementioned limitations of the currently available devices and methods of dispensing and imbibing liquids. Referring generally to FIGS. 1-9, therein illustrated are various embodiments, uses, combinations, and accessories of the metered dual-chambered drinking and dispensing accessory and method of use thereof. As may be understood by those having ordinary skill in the art, various terms may be used interchangeably herein. By way of example and not limitation, liquids contained within the metered dual-chambered drinking and dispensing accessory may be interchangeably used herein and within the metered dual-chambered drinking and dispensing accessory. These may include by way of example and not limitation water and solutes thereof, oils and solutes thereof, spirits, wines, liquors, cocktails, carbonated beverages, beers/ales, medicines, lubricants, the like, and/or combinations thereof. Further, accessory may be used interchangeably with bottle and/or flask herein. While the drawings may be proportional to a potentially preferred embodiment, they may not be drawn exactly to scale and those having ordinary skill in the art may adjust various shapes/sizes to accomplish intended results. Finally, the metered dual-chambered drinking and dispensing accessory in the illustrated embodiment may be referred to throughout as simply flask 100.

Figure 1:
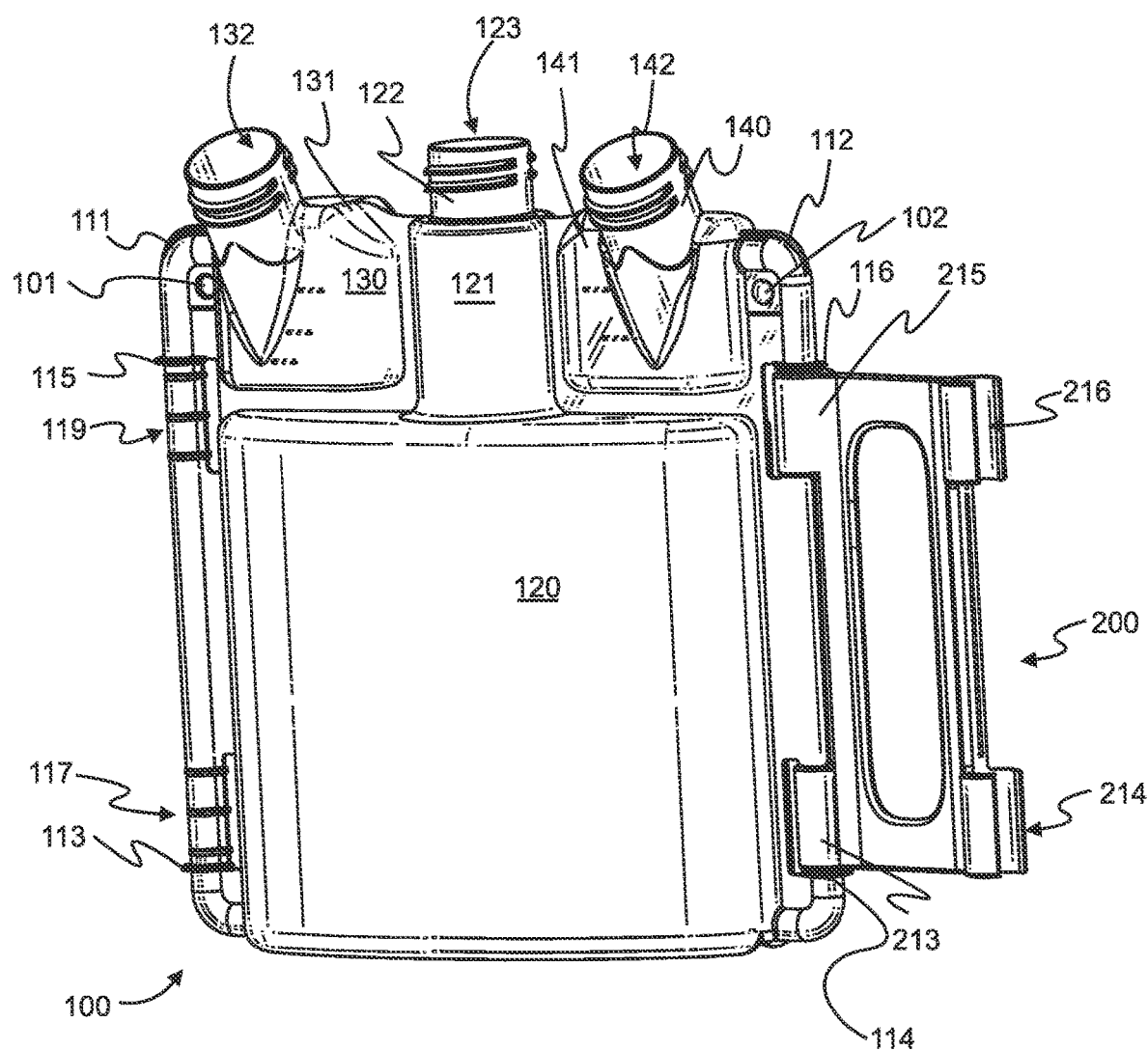
FIG. 1 is a front perspective view of an exemplary embodiment of a metered dual-chambered drinking and dispensing accessory of the disclosure in combination with an accessory clip of the disclosure.

Referring specifically to FIG. 1, illustrated therein is a front perspective view of flask 100. From this view, many features, parts, configurations, and designs may be visible and may offer those having ordinary skill in the art various ideas for uses thereof flask 100. Overall, flask 100 may be understood by those having ordinary skill in the art as having three main components of first metered chamber 130, second metered chamber 140, and main reservoir 120. Beginning at first metered chamber 130, therein illustrated is first metered chamber 130 having first metered spout 132 arising therefrom. First metered spout 132 may be constructed as a simple opening, or may be fashioned to angle toward a drinking and/or pouring side. First metered chamber 130 may be contoured opposite first siphon tube 111, forming first splash prevention contour 131. First metered chamber 130 may be connected proximate a top portion of first metered chamber 130 to main reservoir 120 via first siphon tube 111 as illustrated therein FIG. 1. First siphon tube 111 and its connection and/or construction thereon/thereto first metered chamber 130 and/or main reservoir 120 may further extend to proximate a bottom portion main reservoir 120 and may feature various additional features, as illustrated therein FIG. 1 and described in detail infra. Turning to main reservoir 120, it may be the largest of main reservoir 120, first metered chamber 130, and second metered chamber 140 so as to receive multiple amounts of liquid that may then be diverted into each of first metered chamber 130 and second metered chamber 140. Extending from main reservoir 120 may be main reservoir tube 121 and main reservoir opening 123, through which liquid may be poured. As may be understood by those having ordinary skill in the art, main reservoir 120 may be alternatively constructed to not include either of main reservoir tube 121 and main reservoir opening 123 in embodiments which may be sold pre-filled. However, such construction may benefit from additional features, such as a closable relief valve, to allow for the entry of atmospheric gas and to enable a user easier continued use. Turning to second metered chamber 140, it may be similarly and/or chirally constructed to first metered chamber 130, opposite a center vertical line of main reservoir 120, and may include second splash prevention contour 141 and second metered spout 142. Second metered spout 142 may be constructed as a simple opening, or may be fashioned to angle toward a drinking and/or pouring side. Additionally, second metered chamber 140 may be similarly connected to main reservoir 120 via second siphon tube 112. In use, a large liquid volume may be deposited into main reservoir 120 via main reservoir opening 123 through main reservoir tube 121. Then, cap C may be installed upon main reservoir opening 123 as illustrated in e.g., FIGS. 5 and 7, and perhaps preferably sealed using a threaded cap C and threaded main reservoir opening 123. Then, cap C of first metered spout 132 and/or second metered spout 142 may be removed from each respective cap, loosened upon the respective spout 132, 142, or not installed thereon. Squeezing main reservoir 120 may then cause liquid to travel via first siphon tube 111 and/or second siphon tube 112 into first metered chamber 130 and/or second metered chamber 140, respectively, until a desired amount of liquid reaches the respective chambers 130, 140. A preferable method of squeezing may be grasping flask 100 by main reservoir 120 using one or two hands with thumb(s) on one side of main reservoir 120 and finger(s) opposite. Upon such time a desired volume of liquid has reached main reservoir 120 and/or first metered chamber 130, a user may cease squeezing main reservoir 120. At such time, excess liquid (i.e., liquid above first siphon tube 111 and/or second siphon tube 112) may suction from first metered chamber 130 and/or second metered chamber 140 via first siphon tube 111 and/or second siphon tube 112, respectively, and return to main reservoir 120. Then, a user may have various options for decanting, pouring, consuming, or otherwise removing the liquid therefrom first metered chamber 130 and/or second metered chamber 140. As may be understood by those having ordinary skill in the art, flask 100 and the various parts thereof may be made from one or more suitable materials. In a potentially preferred embodiment of flask 100, flask 100 may be constructed of High Density Polyethylene (HDPE) using extruded and/or injected blow molding, or other suitable materials having the properties of safely containing potable liquids and being relatively flexible at room temperature, but returning to and/or maintaining their molded shape upon a release of internal/external pressure. Other flexible materials suitable for the retention of potable liquids may be substituted for HDPE as may be understood by those having ordinary skill in the art.

In a potentially preferred embodiment of flask 100, as may be illustrated therein FIG. 1, various features may be further included, which in combination or separately, may increase the utility of flask 100. To that end, each of first metered chamber 130 and/or second metered chamber 140 may include first splash prevention contour 131 and/or first metered spout 132, respectively, so as to prevent spillage of liquid therefrom first metered chamber 130 and/or second metered chamber 140. When high pressure is applied to main reservoir 120, liquid may be pressurized in first siphon tube 111 and/or second siphon tube 112. The turbulation therein first metered chamber 130 and second metered chamber 140 may be correspondingly diminished by providing an angular contour, such as first splash prevention contour 131 and/or second splash prevention contour 141, when compared to metered chambers having approximately rectangular prism constructions. Additionally, as illustrated therein FIG. 1, first metered spout 132 and/or second metered spout 142 may be angled, rather than upright. Such construction may further decrease opportunity for spillage therefrom the corresponding chamber, and may offer the additional utility of easing the ability to pour, decant, and/or consume from flask 100. By angling second metered spout 142 and/or first metered spout 132 toward one side, and by providing a V-shaped construction of where spouts 132 and/or 142 meet first metered chamber 130 and/or second metered chamber 140, respectively, multiple other benefits and/or optional uses may be achieved. These may include but are not limited to reduction of the glugging effect during pouring and/or drinking and decreasing the angle of tilt required to drink from flask 100. Another optional feature of main reservoir 120, first metered chamber 130, and or second metered chamber 140 may be measuring indicators, which are illustrated on first metered chamber 130 and second metered chamber 140 of FIG. 1 as horizontal lines. As may be known to those skilled in the art, when constructed of transparent and/or translucent materials, such markings may convey to a user the amount of liquid therein each of main reservoir 120, first metered chamber 130, and/or second metered chamber 140. These markings may further include numbers and units, by way of example and not limitation, e.g., 0.5 oz., 1.0 oz., and 1.5 oz., and may be by way of example and not limitation, printed, indented, embossed, raised, engraved, and/or otherwise visually indicated through known manufacturing techniques.

Other improvements may relate to first siphon tube 111 and second siphon tube 112, such as first clip aperture 101 and second clip aperture 102, respectively. Such an aperture may be featured anywhere between first siphon tube 111 and first metered chamber 130 or second siphon tube 112 and second metered chamber 140 to enable a clip, keyring, carabiner, or other attachment to be operably combined to flask 100 during transport, storage, etc. By way of example and not limitation, a carabiner may be affixed to flask 100 via first clip aperture 101 and/or second clip aperture 102 to enable flask 100 to be clipped to a backpack during a hiking excursion, as may be included in various hiking bottles and flasks known to those having ordinary skill in the art. Additional aperatures may be provided on flask 100, which may preferably reside between first siphon tube 111 and main reservoir 120 and/or second siphon tube 112 and main reservoir 120. In combination with one or more of first top accessory connection area 119 with first top accessory connection ridge 115, first bottom accessory connection area 117 with first bottom accessory connection ridge 113, a second top accessory connection area with second top accessory connection ridge 116, a second top accessory connection area with second bottom accessory connection ridge 114, combination device 200 may be attached to flask 100. Combination device 200 may be constructed of rigid plastic and may operably combine with flask 100 as illustrated therein FIG. 1 to enable removable and rotational connection about first siphon tube 111 and/or second siphon tube 112. When constructed as illustrated therein FIG. 1, combination device 200 may offer the ability to connect multiple units of flask 100 during use and/or storage as illustrated therein FIGS. 7 and 8 and described infra.

Figure 2:
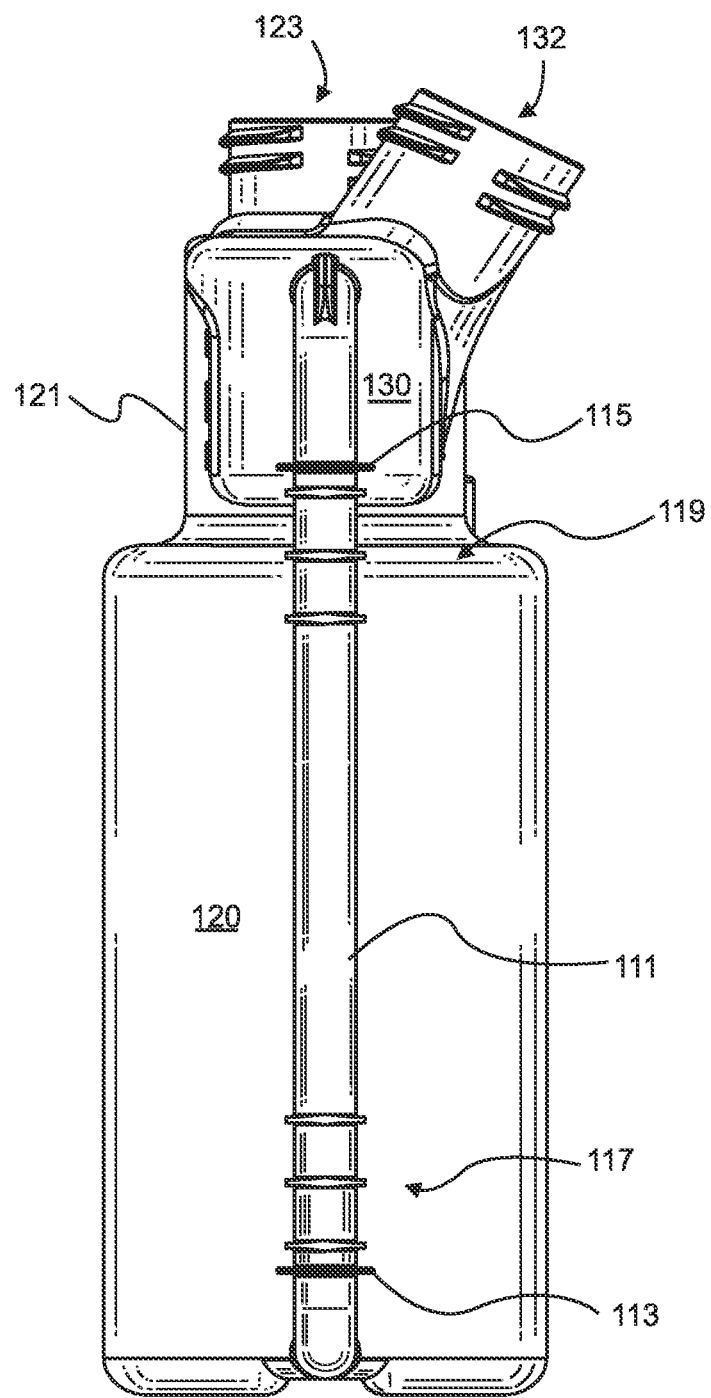
FIG. 2 is a side elevation view of the exemplary metered dual-chambered drinking and dispensing accessory.

Referring specifically to FIG. 2, illustrated therein is a side elevation view of flask 100. From this side elevation view, features, parts, configurations, and designs not apparent in FIG. 1 may be more visible and may offer those having ordinary skill in the art various ideas for uses thereof flask 100. Flask 100 in the embodiment illustrated therein FIG. 2 may be understood by those having ordinary skill in the art as having three main components of first metered chamber 130, second metered chamber 140 (obstructed from view), and main reservoir 120. First metered chamber 130 may be constructed having first metered spout 132 arising therefrom. First metered chamber 130 may be contoured opposite first siphon tube 111, forming first splash prevention contour 131 (obstructed from view). First metered chamber 130 may be operably connected proximate a top portion of first metered chamber 130 to main reservoir 120 via first siphon tube 111 as illustrated therein FIG. 2 so as to provide a connection for fluid transfer therebetween main reservoir 120 and first metered chamber 130. First siphon tube 111 and its connection and/or construction thereon/thereto first metered chamber 130 and/or main reservoir 120 may further extend to proximate a bottom portion main reservoir 120 and may feature various additional features as illustrated and described herein. Turning to main reservoir 120, it may be the largest of main reservoir 120, first metered chamber 130, and second metered chamber 140 so as to receive multiple amounts or "doses" of liquid that may then be diverted into each of first metered chamber 130 and second metered chamber 140. Extending from main reservoir 120 may be main reservoir tube 121 and main reservoir opening 123, through which liquid may be poured into and/or out of main reservoir 120. As may be understood by those having ordinary skill in the art, main reservoir 120 may be alternatively constructed to not include either of main reservoir tube 121 and main reservoir opening 123 in embodiments which may be sold pre-filled. However, such construction as illustrated herein FIG. 2 may benefit from additional features, such as functioning as a closable relief valve, to allow for the entry of atmospheric gas and to enable a user easier continued use. Since in the potentially preferred embodiment of flask 100, flask 100 may be understood by those having ordinary skill in the art to be approximately chiral, those areas obstructed from view in FIG. 2 may be understood to be substantially identical mirror images of those illustrated from this perspective. Cap C may be installed upon main reservoir opening 123, first metered spout 132, and/or second metered spout 142 as may be illustrated in e.g., FIGS. 5 and 7. In use, main reservoir opening 123 may be preferably sealed using a threaded cap C onto threaded main reservoir opening 123. Then, cap C of first metered spout 132 and/or second metered spout 142 may be removed from each respective cap, loosened upon the respective spout 132, 142, or not installed thereon. Squeezing main reservoir 120 may then cause liquid to travel via first siphon tube 111 and/or second siphon tube 112 into first metered chamber 130 and/or second metered chamber 140, respectively, until a desired amount of liquid reaches the respective chambers 130, 140. A preferrable method of squeezing may be grasping flask 100 by main reservoir 120 using one or two hands with thumb(s) on one side of main reservoir 120 and finger(s) opposite (i.e., on the left and right sides of main reservoir 120 as illustrated herein FIG. 2). Upon such time a desired volume of liquid has reached main reservoir 120 and/or first metered chamber 130, a user may cease squeezing main reservoir 120. At such time, excess liquid (i.e., liquid above first siphon tube 111 and/or second siphon tube 112) may suction from first metered chamber 130 and/or second metered chamber 140 via first siphon tube 111 and/or second siphon tube 112, respectively, and return to main reservoir 120. Then, a user may have various options for decanting, pouring, consuming, or otherwise removing the liquid therefrom first metered chamber 130 and/or second metered chamber 140. As may be understood by those having ordinary skill in the art, flask 100 and the various parts thereof may be made from one or more suitable materials. In a potentially preferred embodiment of flask 100, flask 100 may be constructed of High Density Polyethylene (HDPE) using extruded and/or injected blow molding, or other suitable materials having the properties of safely containing potable liquids and being relatively flexible at room temperature, but returning to and/or maintaining their molded shape upon a release of internal/external pressure. Importantly, HDPE may offer many properties which are critical for use in the above manner. When constructed in such a way, main reservoir 120 may be relatively large when compared with first metered chamber 130 and second metered chamber 140. Additionally and/or alternatively, each of first metered chamber 130 and second metered chamber 140 may be constructed of thicker walls in comparison to main reservoir 120. Each property—the relative size/surface area and chamber thickness—may offer the benefit of main reservoir 120 having walls which are relatively flexible to allow for changes in internal volume and/or pressure when closed. Conversely, a relatively smaller size and relatively increased thickness of the walls of first metered chamber 130 and/or second metered chamber 140 may restrict the flexibility of those chambers to restrict their ability to fluctuate in size and/or pressure when squeezed and/or subject to pressures via connection with main reservoir 120.

Figure 3:
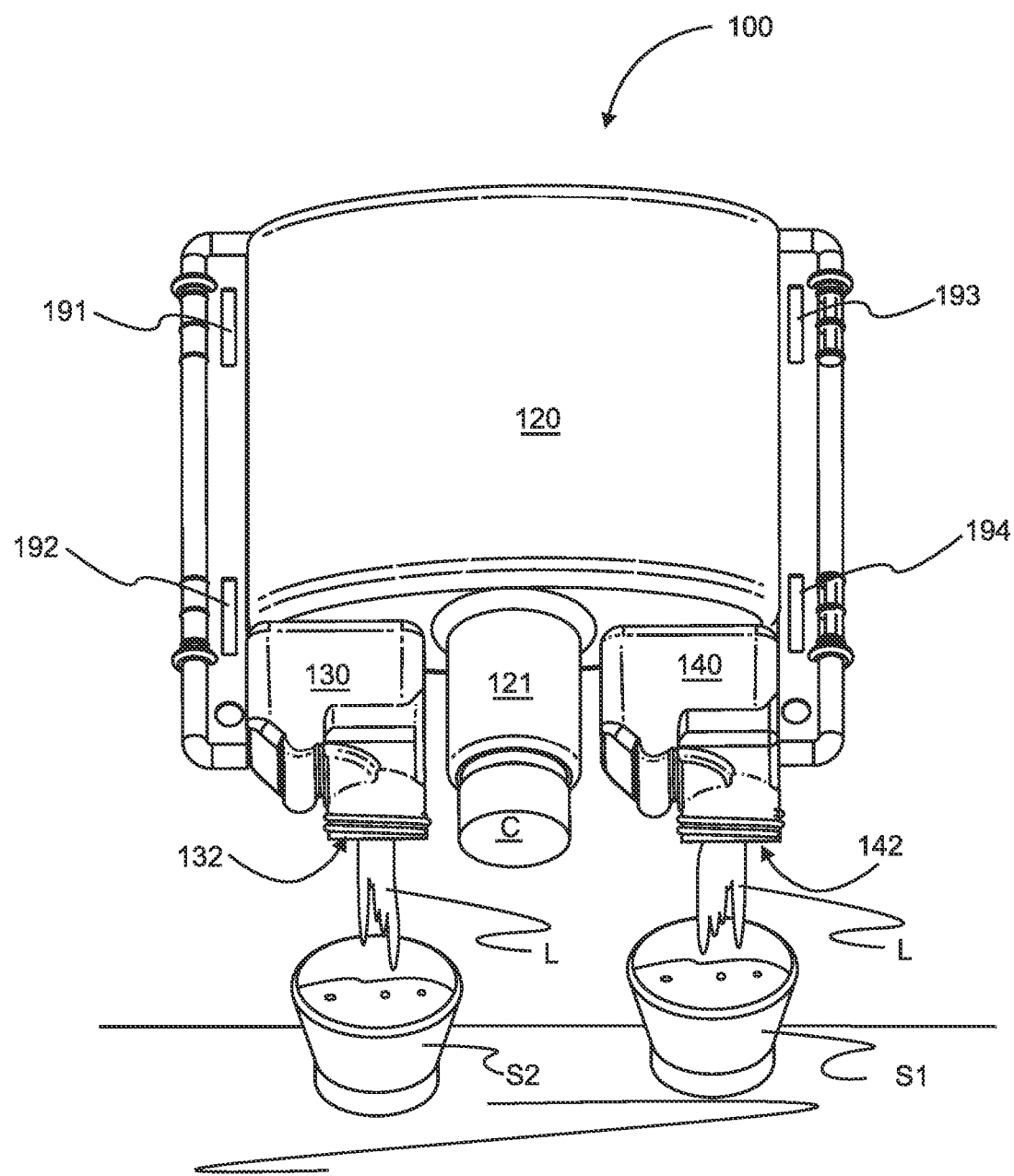
FIG. 3 is a perspective view of the exemplary metered dual-chambered drinking and dispensing accessory inverted and dispensing liquid into a shot/cocktail glass.

Referring specifically to FIG. 3, illustrated therein is an perspective view of inverted flask 100 dispensing liquid L into shot glasses S1, S2. From this perspective view, main reservoir 120 having main reservoir tube 121 with cap C threaded thereupon main reservoir opening 123, first metered chamber 130 with first metered spout 132, second metered chamber 140 with second metered spout 142, first siphon tube 111 therebetween main reservoir 120 and first metered chamber 130, and second siphon tube 112 therebetween main reservoir 120 and second metered chamber 140 can be observed. Thorough detailed description thereof are included in the relevant descriptions of FIGS. 1-2. From this perspective, first connection aperture 191, second connection aperture 192, third connection aperture 193, and fourth connection aperture 194 may be better observed. These optional apertures may function alongside combination device 200 to enable removable operable combination with flask 100 and rotation of combination device 200 thereabout first siphon tube 111 and/or second siphon tube 112 to provide the features described supra. Prior to positioning flask 100 in the manner illustrated herein FIG. 3, a user may first fill main reservoir 120 with liquid L, seal cap C upon threaded spout 122, loosen and/or remove two of cap C upon first metered spout 132 and/or second metered spout 142 (or not install them), and squeeze flask 100 about main reservoir 120 as described above to achieve a desired amount of liquid L in each of first metered chamber 130 and second metered chamber 140. Additionally, shot S1 and/or shot S2 may be placed upon a lateral surface, such as a bar, at some distance approximately equivalent to the corresponding distance between first metered chamber 130 and second metered chamber 140. Then, as illustrated herein FIG. 3, flask 100 may be inverted over shot S1 and/or shot S2, such that the angled spouts of first metered spout 132 and second metered spout 142 face the bar and/or shots S1, S2. Upon inversion, liquid L may leave first metered chamber 130 and/or second metered chamber 140 and pour into shots S1, S2, preferably simultaneously, enabling the user to dispense two volumes of the desired liquid L into each of shots S1, S2. As may be understood by those having ordinary skill in the art, shots S1, S2 may be single shot glasses having a volume capacity of approximately 1.5 oz., or may be larger vessels, such as highballs, cocktail glasses, double shot glasses, the like and/or combinations thereof. Limitless possibilities may exist for such uses, including but not limited to dispensing metered amounts for cocktail recipes, repeating the procedure on a single pair of glasses to dispense stronger drinks, mixing several spirits/liquors/syrups/mixers/botanicals/tinctures into main reservoir 120 for dispense thereof, the like and/or combinations thereof.

Figure 4:
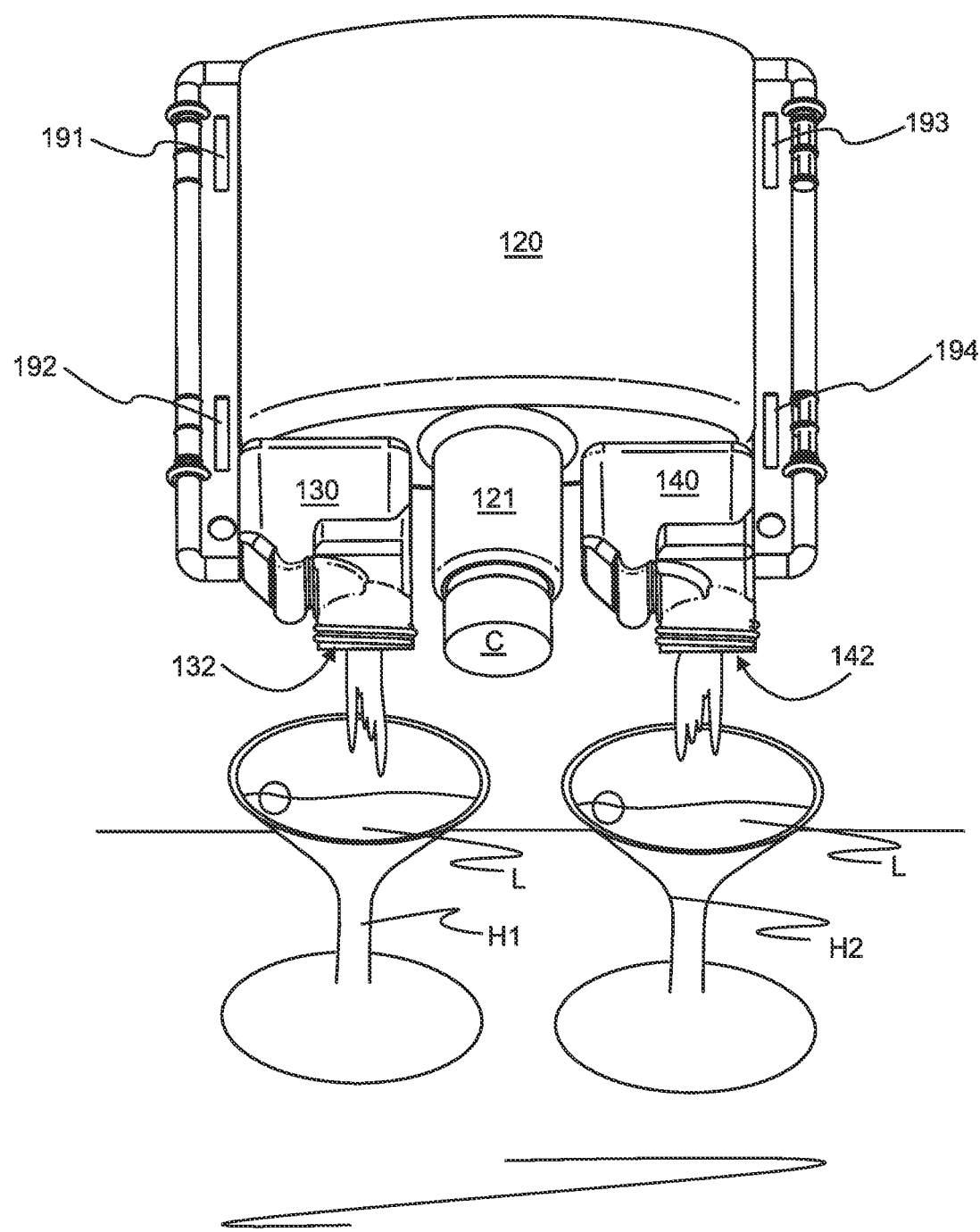
FIG. 4 is a perspective view of the exemplary metered dual-chambered drinking and dispensing accessory inverted and dispensing liquid into a martini drinkware.

Referring specifically to FIG. 4, illustrated therein is a perspective view of flask 100 being inverted to dispense liquid L into martini glasses H1, H2. From this perspective view, main reservoir 120 having main reservoir tube 121 with cap C threaded thereupon main reservoir opening 123, first metered chamber 130 with first metered spout 132, second metered chamber 140 with second metered spout 142, first siphon tube 111 therebetween main reservoir 120 and first metered chamber 130, and second siphon tube 112 therebetween main reservoir 120 and second metered chamber 140 can be observed. Thorough detailed description thereof are included in the relevant descriptions of FIGS. 1-2. From this perspective, first connection aperture 191, second connection aperture 192, third connection aperture 193, and fourth connection aperture 194 may be better observed. As described supra, these optional apertures may function alongside combination device 200 to enable removable operable combination with flask 100 and rotation of combination device 200 thereabout first siphon tube 111 and/or second siphon tube 112 to provide the features described supra. Prior to positioning flask 100 in the manner illustrated herein FIG. 4, a user may first fill main reservoir 120 with liquid L, seal cap C upon threaded spout 122, loosen and/or remove two of cap C upon first metered spout 132 and/or second metered spout 142 (or not install them), and squeeze flask 100 about main reservoir 120 as described above to achieve a desired amount of liquid L in each of first metered chamber 130 and second metered chamber 140. Additionally, martini glass h1 and/or martini glass H2 may be placed upon a lateral surface, such as a bar, at some distance approximately equivalent to the corresponding distance between first metered chamber 130 and second metered chamber 140. Then, as illustrated herein FIG. 3, flask 100 may be inverted over shot S1 and/or shot S2, such that the angled spouts of first metered spout 132 and second metered spout 142 face the bar and/or martini glasses H1, H2. Upon inversion, liquid L may leave first metered chamber 130 and/or second metered chamber 140 and pour into martini glasses H1, H2, preferably simultaneously, enabling the user to dispense two volumes of the desired liquid L into each of martini glasses H1, H2. As may be understood by those having ordinary skill in the art, martini glasses H1, H2 may be martini glasses having a standard volume capacity of approximately 5-6 oz., or may be smaller or larger vessels for the consumption of various spirits and/or cocktails. As described above, limitless possibilities may exist for such uses.

Figure 5:
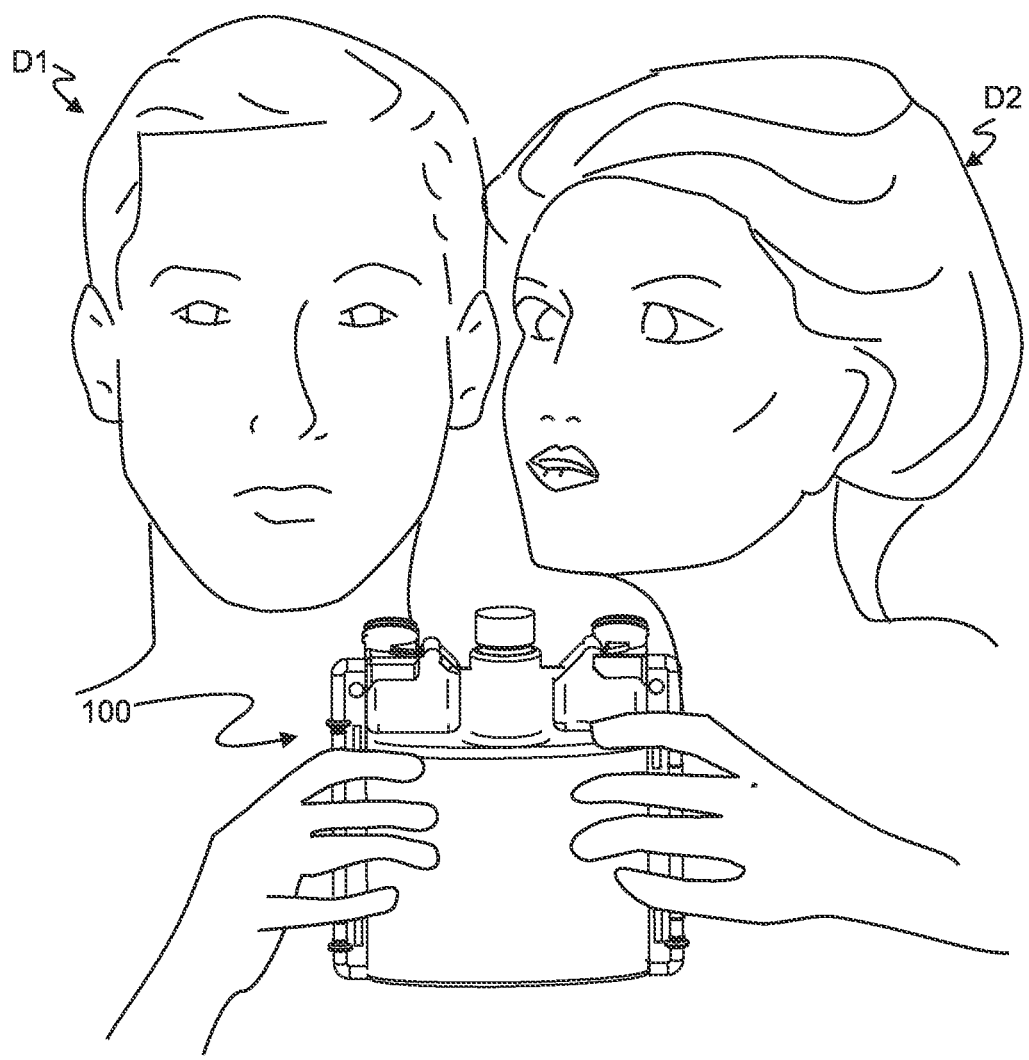
FIG. 5 is a front perspective view of the exemplary metered dual-chambered drinking and dispensing accessory being held by a couple prior to consumption of the liquid therein.

Referring specifically to FIG. 5, illustrated therein is a front perspective view of flask 100 being held by a couple prior to consumption of the liquid therein. In an alternate or perhaps preferable use of flask 100, flask 100 may be used socially to drink in coordination with a friendly and/or romantic partner. Additionally, flask 100 may be used in other recreational ways to induce fun and frivolity among friends or common partygoers. For instance, flask 100 may be used in a game and passed among various partygoers, who may be encouraged to sip, kiss, or pass flask 100. In such a game, drinker D1 may encourage drinker D2 to hold flask 100 by main reservoir 120. Drinker D1 may then ask drinker D2 whether she wants to sip, kiss, or pass flask 100. If drinker D2 decides she wants to sip, they may follow the procedure listed above to squeeze flask 100 proximate main reservoir 120 and proceed to consume the liquid therein one of first metered chamber 130 and second metered chamber 140 simultaneously with drinker D1. If she chooses kiss, drinker D1 may instead kiss drinker D2. If they decide to pass, they may pass flask 100 to other partygoers. In a more "high stakes" version of such a game, the choices may simply be kiss or sip, or even kiss and sip, where drinkers D1, D2 may be a romantic couple. Those having ordinary skill in the art of creating and participating in drinking games may develop other uses for flask 100, separately or in combination with existing drinking games known to those skilled in such arts, which are implicitly described herein.

Figure 6:
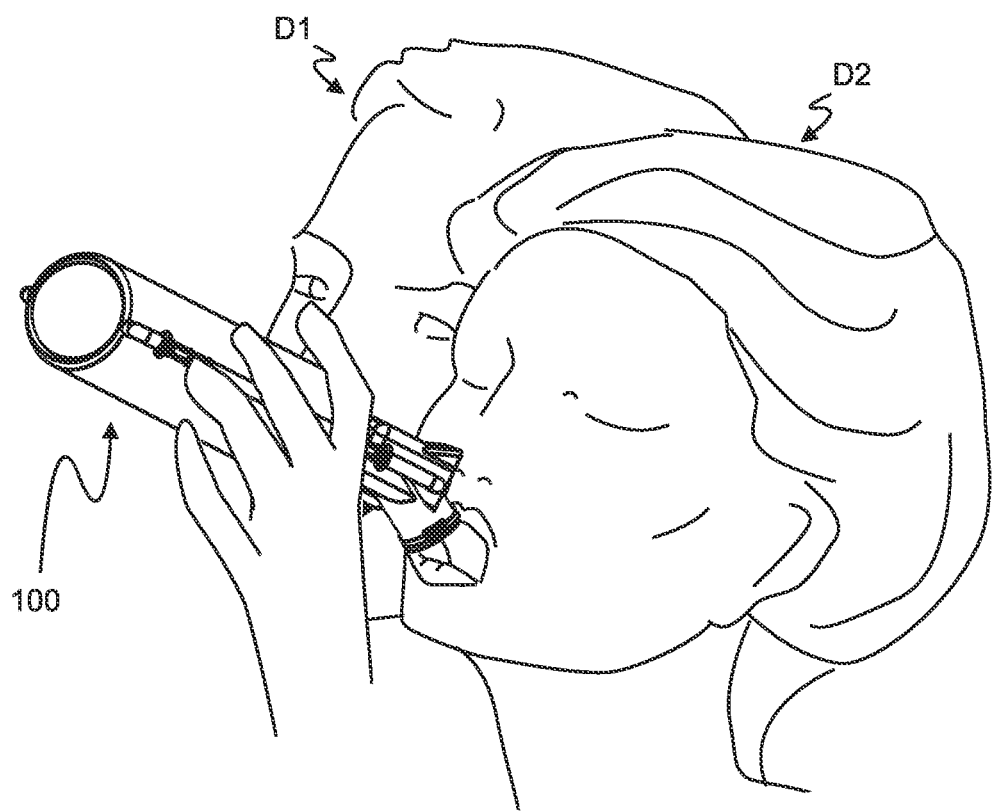
FIG. 6 is a front perspective view of the exemplary metered dual-chambered drinking and dispensing accessory being held by the couple during consumption of the liquid therein.

Referring specifically to FIG. 6, illustrated therein is a front perspective view of flask 100 being held by drinkers D1, D2 during consumption of the liquid therein. As described in relation to FIG. 5, flask 100 may be used in various settings for recreational drinking and consumption of spirits/beverages. When viewed from the perspective of FIG. 6, the angular nature of first metered spout 132 and second metered spout 142 may be better appreciated such that drinkers D1, D2 do not need to fully recline or otherwise adjust their heads when consuming liquids from flask 100. Additionally, the comradery and/or flirtatiousness of use of flask 100 may be further observed therein FIG. 6.

Figure 7:
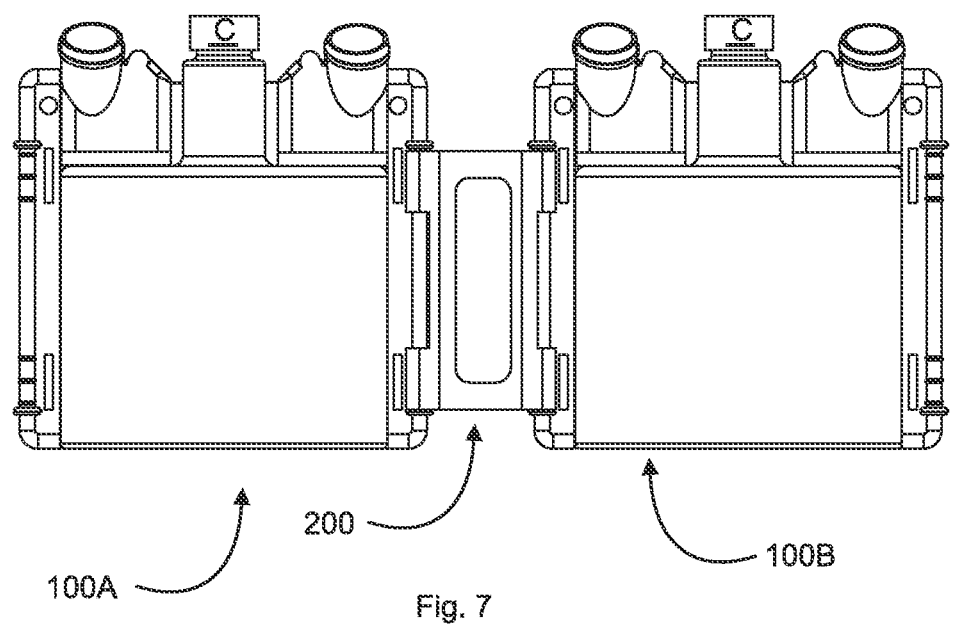
FIG. 7 is a front elevation view of two of the exemplary metered dual-chambered drinking and dispensing accessories joined by the clip accessory of the disclosure in a linear arrangement.

Referring specifically to FIG. 7, illustrated therein is a front elevation view of two of flask 100 joined by combination device 200 of the disclosure in a linear arrangement. As illustrated and described therein FIG. 1, various features of flask 100 may enable the removable operable combination of flask 100 to enable rotational use of combination device 200 about either of first siphon tube 111 and second siphon tube 112. Given that combination device 200 is constructed to removably operably combine with the chiral flask 100, it may be constructed to connect to another opposite to create a potentially endless chain of multiple of flask 100. Additionally, two or more of flask 100 may be linked with two or more of combination device 200 to complete a loop, the loop having a non-finite limit of flask 100 and combination device 200. Such construction of two of flask 100 and two of combination device 200 are described infra. Such linear combination of two or more of flask 100 may increase the ability to perform the tasks described in relation to both pouring and drinking from flask 100, further enhancing the uses and utility thereof.

Figure 8:
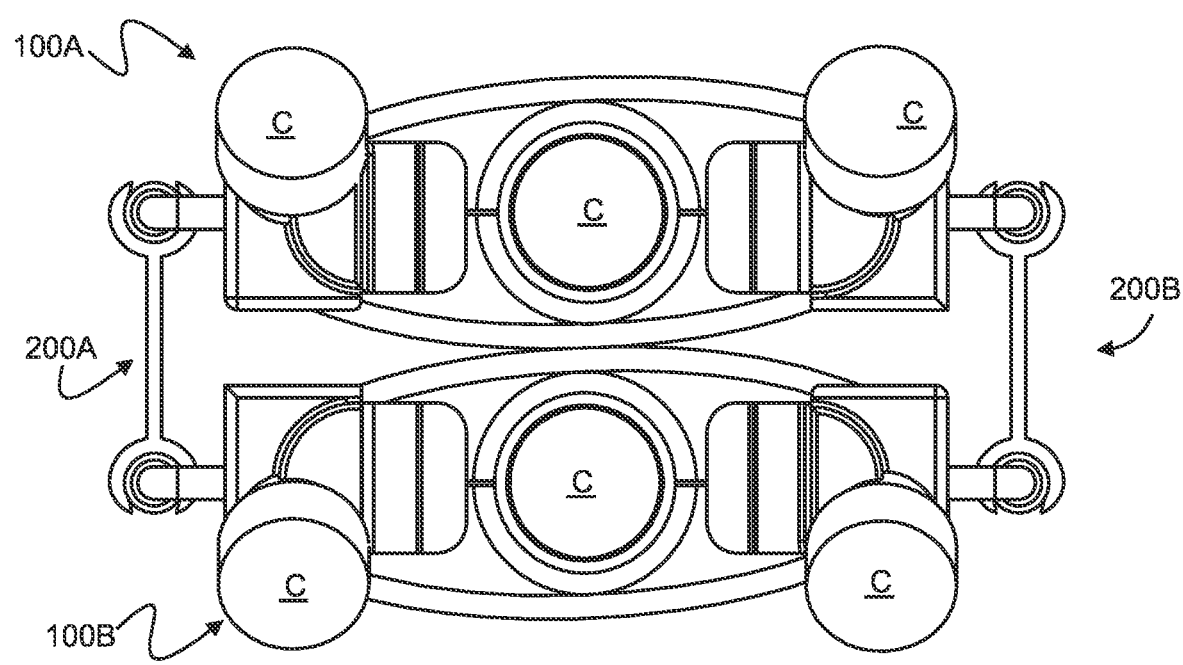
FIG. 8 is a top plan view of two of the exemplary metered dual-chambered drinking and dispensing accessory joined by two clip accessories of the disclosure in a stacked arrangement.

Referring specifically to FIG. 8, illustrated therein is a top plan view of two of flask 100 (first flask 100A and second flask 100B) joined by two of combination device 200 (first combination device 200A and second combination device 200B) in a stacked arrangement. As illustrated and described therein FIG. 1, various features of flask 100 may enable the removable operable combination of flask 100 to enable rotational use of combination device 200 about either of first siphon tube 111 and second siphon tube 112. Given that combination device 200 is constructed to removably operably combine with the chiral flask 100, it may be constructed to connect to another opposite via first combination device 200A and second combination device 200B to removably link first flask 100A and second flask 100B. Such increased utility that is provided via this configuration may include but is not limited to storage during transit, storage of multiple liquors in a bar for more convenient use, the ability to dispense multiple liquors from a single unit, as well as other uses that may be recognizable to those having ordinary skill in the art. Though each opening of flask 100 may be identically constructed to receive identical versions of cap C, for sake of ease of manufacture and use, cap C and the various openings may be distinct in alternate versions of flask 100.

Figure 9:
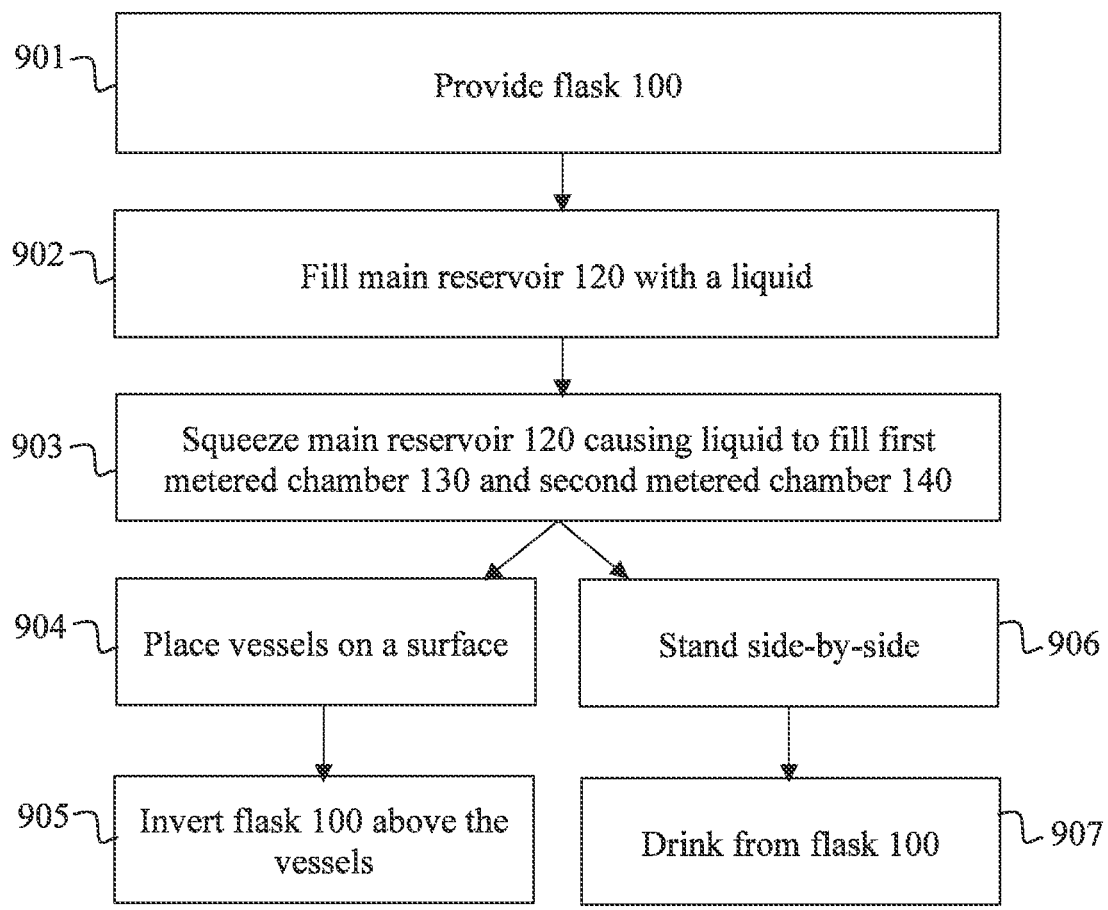
FIG. 9 is a flowchart of an exemplary method of use of the metered dual-chambered drinking and dispensing accessory.

Referring specifically to FIG. 9, illustrated therein is a flowchart of an exemplary method of use of flask 100. At step 901, flask 100 is provided and filled at step 902 with any liquid as may be described herein. Then, as may be variously described herein, main reservoir 120 is squeezed to cause first metered chamber 130 and/or second metered chamber 140 to fill with the liquid via first siphon tube 111 and/or second siphon tube 112 at step 903. Upon such time that sufficient liquid has filled either or each of first metered chamber 130 and second metered chamber 140, a user can cease squeezing main reservoir 120 and excess liquid above the connections to first siphon tube 111 and second siphon tube 112 may be siphoned back into main reservoir 120 via first siphon tube 111 and/or second siphon tube 112. The method diverges at steps 904 and 905. In a first embodiment of the method at step 904, vessels, such as glasses S1, S2 or martini glasses H1, H2 may be placed on a surface approximately spaced as each opening of first metered chamber 130 and second metered chamber 140. Then, flask 100 may be inverted to fill the vessels. In the alternate method, at step 906, drinkers such as drinkers D1, D2 may stand side-by-side and drink from the flask at step 907. As may be appreciated by those having ordinary skill in the art, many variations of the proposed methods may be achievable, especially given the modular features of combination device 200 and other improvements to flask 100 that may be described herein or contemplated by those having ordinary skill in the art. As further may be understood by those having ordinary skill in the art and as is described supra, prior to step 903, cap C atop each metered chamber opening/spout should be removed, not installed, or loosened to defeat the sealing properties thereof to allow for the escape of gases that may be contained therein and thereby enabling the entry of liquid into first metered chamber 130 and second metered chamber 140. Finally, other variations in the method of use of flask 100 may be observed and practiced by those having ordinary skill in the art. First, a straw may be employed on main reservoir 120, first metered chamber 130, and second metered chamber 140 via each corresponding spout. Additionally, the squeezing that occurs at step 903 may be repeated during step 907 to produce a "power shot" during consumption and achieve a volume beyond what may be offered from a standard consumption procedure. Many of the steps included in FIG. 9 may additionally be obviated, and a user of flask 100 may simply drink or pour from main reservoir 120 via threaded spout 122 or through a straw placed therein. Finally, the benefit of reducing an angle of tilt during consumption may be achieved through the included combination of the contoured and/or angled spouts of first metered spout 132 and/or second metered spout 142 and siphon tubes 111 and 112 since it can be recognized that flasks having low volumes require additional tilting to pour and/or drink, the siphoning of liquid from the bottom of a larger container into the top of a smaller container increases the corresponding volumetric percentage, thereby reducing the angle of tilt required to dispense and/or consume.

The drawings described herein are intended to provide a general understanding of the structure of various embodiments of the disclosed device. The illustrations are not intended to serve as a complete description of all of the elements and features of the apparatus, product, method of use, and/or system that utilizes the structures and/or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

As contemplated herein, the dispenser may be manufactured in various shapes and sizes, including but not limited to shapes such as cylinders, triangular prisms, rectangular prisms, cubes, cones/funnels, the like and/or combinations thereof and all sizes by which liquids in any form may be stored. Various parts of the dispenser may also be embodied in various shapes and sizes and the disclosure is not so limited to those embodied in the prototype. To this end, by way of example and not limitation, lids may be threaded or of the childproof variety, tubes may be attached to the reservoir along its length, they may be detached and only connected at the base and metered reservoir(s), the tubes may be straight, bent, curved, "crazy straws", or in the shape by which they may double as handles for the dispenser, as well as modifications of the like and/or combinations thereof. While specific materials may be contemplated herein for the construction of the dispenser, the disclosure is not so limited. One skilled in the art may know of other suitable materials for the purposes described herein and suitable materials not known at the time of the invention may be developed. It is further contemplated that the dispenser may be manufactured from a variety of materials including but not limited to food-grade plastics, flexible metals, water-containing fabrics, composite materials, the like and/or combinations thereof. By way of example and not limitation, an adult beverage manufacturer and/or distillery may design and sell its beverage or spirit in a dispenser of the disclosure. The dispenser may have reservoirs sized to industry standards (e.g. 750 mL main reservoir and 1.5 oz metered reservoirs). The number of metered dispensing reservoirs is not limited to 2 and may be any reasonable number in a number of configurations including but not limited to 3, 4, 5, 6, 7, 8, 9 and so on in linear, triangular, quadrangular, circular, etc. configurations. Liquid contained in the reservoir is not limited to any liquid of any specific type and may include by way of example and not limitation: beer, wine, cocktails, liquor, ports, sparkling wine, broth, water, tea, coffee, juice, milk, oils, syrups, emulsions, baby food, brine, smoothy, detergents, medicine, acids, bases, the like and/or combinations thereof. Additional components, including cooling/heating elements, filters, quality indicators, coverings, straws, the like and/or combinations thereof are contemplated herein. It is further herein contemplated that modifications may be made to the device of the disclosure so as to allow for the dispensing of mixed liquids. Modifications may include the addition of at least one additional main reservoir and an at least one intake spout and/or a bifurcated intake spout. Additionally, such a modification may allow for the simultaneous mixing of the liquids in each reservoir in a single dispensing reservoir (i.e., the liquids may instead be siphoned into a single dispensing reservoir from two or more main reservoirs). Modifications to accommodate these two or more reservoirs may include by way of example and not limitation: a front and back rigid portion of the flexible reservoir, an intake spout having an internal bifurcation to allow for multiple liquids to be added, an additional intake spout, the like and/or combinations thereof.

In use, the dispenser may be filled with a liquid desired to be consumed or may be sold pre-filled with said liquid. The center intake lid may be loosened and removed to fill the reservoir then the lid may be replaced. Then, having secured the center intake lid upon the intake spout, one or more of the dispensing lids are loosened and/or removed from the dispensing spout. Then the reservoir is squeezed, and the resulting pressure shall cause liquid to siphon from the reservoir through the tubes and into the metered reservoirs. Once so filled, one or more of the lids, if loosened, may be removed and the liquid may be consumed directly from the metered dispensing spout or poured. From time to time, the intake spout lid may need to be removed and/or loosened to allow for intake of atmospheric air so as to ease the amount of pressure required to begin the syphoning process. Similarly, liquid may be added using the same process. Various steps in this process may be modified and/or shuffled and by so doing may produce the same or substantially similar results.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A metered liquid dispensing bottle comprising:
a first reservoir having a first opening opposite a bottom, said first reservoir constructed of a flexible material;
a second reservoir having a second opening and a first fluid connection thereto the first reservoir; and
a third reservoir having a third opening and second fluid connection thereto the first reservoir;
wherein said first and second fluid connection is proximate said bottom of said first reservoir and proximate an upper portion of said second and said third reservoirs; and
wherein said second opening and said third opening are displaced toward a direction, said direction is an angle between a vertical plane intersecting said first and second fluid connections and a horizontal plane parallel to said bottom.

2. The bottle of claim 1, wherein said first, second, and third openings are a first threaded opening, a second threaded opening, and a third threaded opening.

3. The bottle of claim 2, wherein said first, second, and third threaded openings are constructed to receive a threaded cap, said threaded cap is capable of sealing said first, second, and third threaded openings.

4. The bottle of claim 3, wherein said first fluid connection is a first tube and said second fluid connection is a second tube.

5. The bottle of claim 4, wherein upon a seal of said first threaded opening and a squeezing of said first reservoir, a liquid within said first reservoir is forced into said second reservoir and said third reservoir via said first and second tubes.

6. The bottle of claim 1, wherein each of said second and third reservoirs are contoured opposite said first fluid connection and said second fluid connection to reduce a turbulence during a fluid transfer from said first reservoir.

7. The bottle of claim 6, wherein said angle is further defined as an oblique angle facing toward an at least one user when held by said at least one user.

8. The bottle of claim 7, wherein said angle is 45 degrees.

9. The bottle of claim 1, wherein said bottle is constructed of a High Density Polyethylene (HDPE) material via an injection blow molding.

10. The bottle of claim 9, wherein an at least one aperture exists between one of said first reservoir and said first fluid connection and said first reservoir and said second fluid connection.

11. The bottle of claim 10, further comprising a connection accessory capable of a removable operable combination with the bottle via said at least one aperture.

12. The bottle of claim 11, wherein the connection accessory is a clip comprising a first partially open hollow cylindrical body opposite a second partially open hollow cylindrical body, said first partially open hollow cylindrical body and said second partially open hollow cylindrical body are sized and configured to receive and rotatably engage said first fluid connection or said second fluid connection, thereby enabling rotational movement of said clip relative to the bottle.

* * * * *